United States Patent
Kaita et al.

(10) Patent No.: US 7,114,484 B2
(45) Date of Patent: Oct. 3, 2006

(54) DRIVE APPARATUS, CONTROL METHOD THEREOF, AND MOTOR VEHICLE EQUIPPED WITH THE APPARATUS AND THE METHOD

(75) Inventors: Keiji Kaita, Nishikamo-gun (JP); Shinichi Abe, Aichi-gun (JP); Satoshi Kaneko, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/945,998

(22) Filed: Sep. 22, 2004

(65) Prior Publication Data

US 2005/0066933 A1  Mar. 31, 2005

(30) Foreign Application Priority Data

Sep. 29, 2003 (JP) ............................. 2003-338083

(51) Int. Cl.
F02B 75/02 (2006.01)
F01L 1/34 (2006.01)

(52) U.S. Cl. ................. 123/198 R; 123/316; 123/90.15

(58) Field of Classification Search ............ 123/198 R, 123/316, 90.15; 701/110, 112
See application file for complete search history.

(56) References Cited

U.S. PATENT DOCUMENTS 6,769,404 B1 * 8/2004 Aoyama et al. ....... 123/406.29

6,807,476 B1 * 10/2004 Ando et al. ................. 701/110

FOREIGN PATENT DOCUMENTS

| JP | 11-107891   | 4/1999  |
|----|-------------|---------|
| JP | 2001-193540 A | 7/2001 |
| JP | 2001-254646 A | 9/2001 |
| JP | 2001-304080 A | 10/2001 |
| JP | 2002-061522 A | 2/2002 |

* cited by examiner

Primary Examiner—Stephen K. Cronin
Assistant Examiner—Hyder Ali
(74) Attorney, Agent, or Firm—Kenyon & Kenyon LLP

(57) ABSTRACT

Provided herein are a drive apparatus that includes an internal combustion engine capable of operating with a high expansion ratio by reducing an effective compression ratio through advancement of an intake valve closing timing, and a control method of the drive apparatus, and a motor vehicle equipped with the apparatus and method. The drive apparatus further includes a torque output device capable of outputting a torque to an output shaft of the internal combustion engine. Upon a command to stop operation of the internal combustion engine, the apparatus controls the driving of the torque output device so that the internal combustion engine stops at a target stop position which is set outside a region that leads to an increased compression ration in an initial compression stroke when the internal combustion engine is next stated.

11 Claims, 4 Drawing Sheets

DRIVE APPARATUS, CONTROL METHOD THEREOF, AND MOTOR VEHICLE EQUIPPED WITH THE APPARATUS AND THE METHOD

INCORPORATION BY REFERENCE

The disclosure of Japanese Patent Applications No. 2003-338083 filed on Sep. 29, 2003 including the specification, drawings and abstract is incorporated herein by reference in its entirety.

BACKGROUND OF THE INVENTION

1. Field of the Invention

The invention relates to a drive apparatus and a motor vehicle equipped with the drive apparatus. More particularly, the invention relates to a drive apparatus that includes an internal combustion engine capable of operating with a high expansion ratio by reducing the effective compression ratio through advancement of the intake valve closing timing, and a control method of the drive apparatus, and a motor vehicle equipped with the apparatus and the method.

2. Description of the Related Art

A related-art drive apparatus of the aforementioned type has been proposed which includes a motor-generator directly coupled to a crankshaft of the engine, and which drives and controls the motor-generator so as to stop the crankshaft of the engine at a desired position when a condition for stopping the engine is met. Such a drive apparatus is disclosed in, for example, JP(A) 2001-30408. In this drive apparatus, the engine is stopped at a predetermined position of the crankshaft of the engine, so as to improve the startability of the engine at the next time of starting the engine.

In the above-described drive apparatus, however, no consideration is given to the stop position in a high-expansion ratio cycle engine that is capable of attaining a high expansion ratio by reducing the effective compression ratio through advancement of the timing of closing an intake valve. In the high-expansion ratio cycle engine, if the intake valve is closed at an intermediate point during the intake stroke, the intake gas undergoes expansion, and then is compressed. Therefore, depending on the stop position of the engine, there may occur an incident where when the engine stops, a negative pressure exists in a cylinder, so that air enters the cylinder space via clearances between the cylinder and the piston, and therefore when the engine is next started, the compression ratio in the initial compression stroke becomes rather high, thus leading to a cause for knocking or the like.

SUMMARY OF THE INVENTION

In view of the aforementioned problems, a drive apparatus, a control method thereof and a motor vehicle equipped therewith in accordance with the invention control an internal combustion engine capable of operating with a high expansion ratio by reducing an effective compression ratio through advancement of an intake valve closing timing, in such a manner that the engine stops at a position that facilitates smooth startup when the engine is next started. Therefore, the startability of the internal combustion engine further improves.

The invention provides, as an exemplary embodiment, a drive apparatus having an internal combustion engine capable of operating with a high expansion ratio by reducing an effective compression ratio through advancement of an intake valve closing timing. The drive apparatus further includes a torque output device capable of outputting a torque to an output shaft of the internal combustion engine, and a controller that, upon a command to stop operation of the internal combustion engine, controls driving of the torque output device so that the internal combustion engine stops at a target stop position which is set outside a region that leads to an increased compression ratio in an initial compression stroke when the internal combustion engine is next started.

Another aspect of the invention provides a control method of a drive apparatus having an internal combustion engine capable of operating with a high expansion ratio by reducing an effective compression ratio through advancement of an intake valve closing timing, and a torque output device capable of outputting a torque to an output shaft of the internal combustion engine. The control method includes the steps of: detecting a stop of operation of the internal combustion engine; applying a torque to the output shaft of the internal combustion engine via the torque output device; and controlling driving of the torque output device so that the internal combustion engine stops at a target stop position which is set outside a region that leads to an increased compression ratio in an initial compression stroke when the internal combustion engine is next started.

According to the drive apparatus and the control method as described above, upon a command to stop operation of the internal combustion engine capable of operating with a high expansion ratio by reducing an effective compression ratio through advancement of the intake valve closing timing, the driving of the torque output device capable of outputting torque to the output shaft of the engine is controlled so that the engine stops at a target stop position which is set outside the region that leads to increases in the compression ratio in the initial compression stroke when the engine is next started. Therefore, the occurrence of knocking or the like at the time of startup of the engine can be substantially prevented or reduced, and the startup of the engine can be smoothly carried out when the command to operate the engine is next given.

It is to be noted herein that the torque output device includes devices that output torque to an output shaft of an internal combustion engine in the forward rotating direction (direction in which the engine is driven) and devices that output torque in a direction opposite to the forward direction of the engine.

Still another aspect of the invention provides a motor vehicle equipped with a drive apparatus as described above. This drive apparatus is basically a drive apparatus which has an internal combustion engine capable of operating with a high expansion ratio by reducing an effective compression ratio through advancement of an intake valve closing timing, and which further has a torque output device capable of outputting a torque to an output shaft of the internal combustion engine, and a controller that, upon a command to stop operation of the internal combustion engine, controls driving of the torque output device so that the internal combustion engine stops at a target stop position which is set outside a region that leads to an increased compression ratio in an initial compression stroke when the internal combustion engine is next started.

The motor vehicle described above, which is equipped with the drive apparatus, achieves substantially the same advantages as those of the drive apparatus of the invention, for example, substantial prevention or reduction of occurrence of knocking at the time of startup of the engine, facilitation of smooth startup of the engine, etc.

BRIEF DESCRIPTION OF THE DRAWINGS

The above mentioned and other objects, features, advantages, technical and industrial significances of this invention will be better understood by reading the following detailed description of exemplary embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments.

Figure 1:
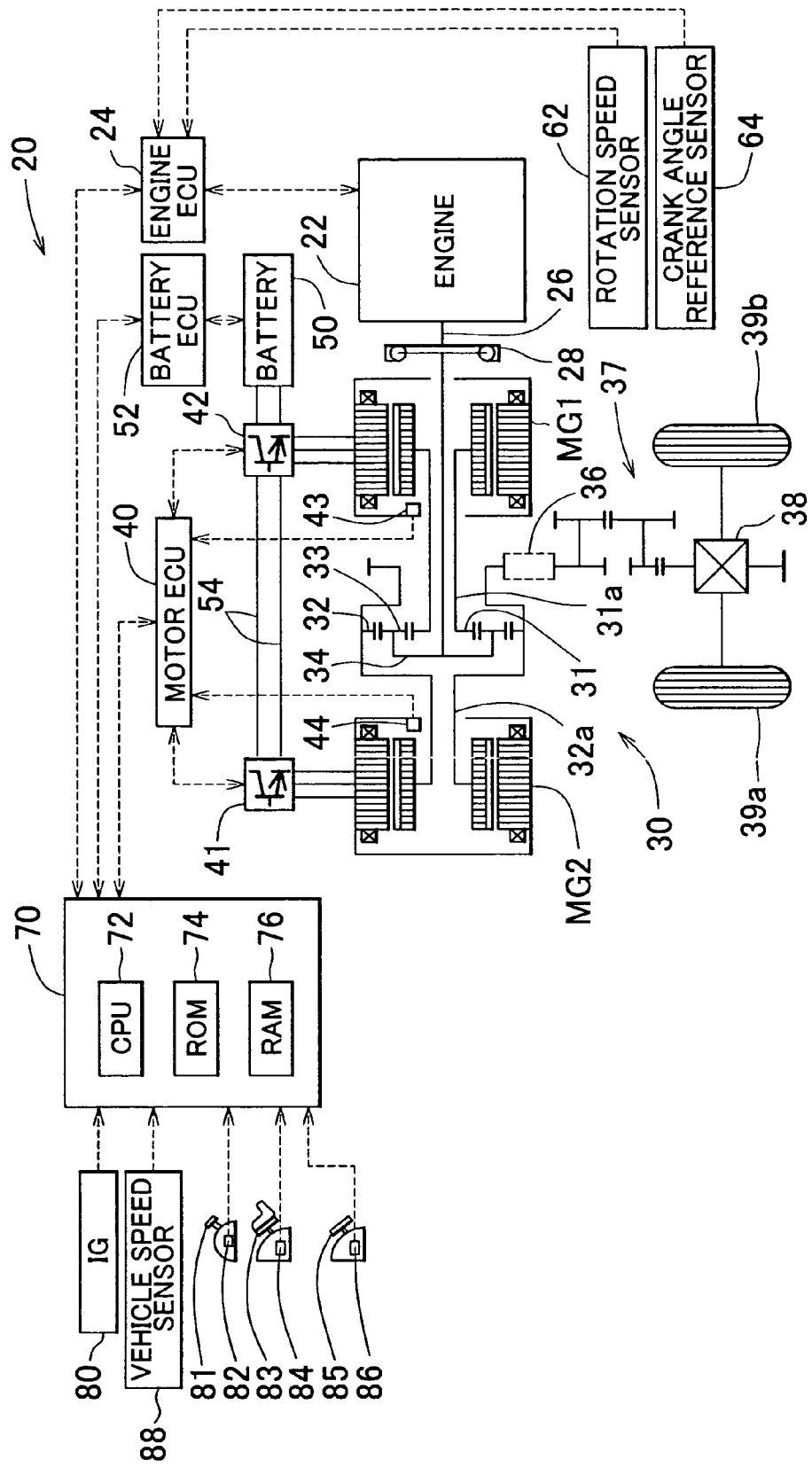
FIG. 1 is a schematic diagram illustrating a construction of a hybrid motor vehicle equipped with a drive apparatus in accordance with an embodiment of the invention.

FIG. 1 is a schematic diagram illustrating a construction of a hybrid motor vehicle 20 equipped with a drive apparatus in accordance with an embodiment of the invention. As shown in FIG. 1, the hybrid motor vehicle 20 of this embodiment has an engine 22, a three-shaft type power distribution/integration mechanism 30 connected to a crankshaft 26, that is, an output shaft of the engine 22, via a damper 28, an electric motor MG1 capable of generating power which is connected to the power distribution/integration mechanism 30, and an electric motor MG2 connected to the power distribution/integration mechanism 30, and a hybrid-purpose electronic control unit 70 that controls the entire drive apparatus.

Figure 2:
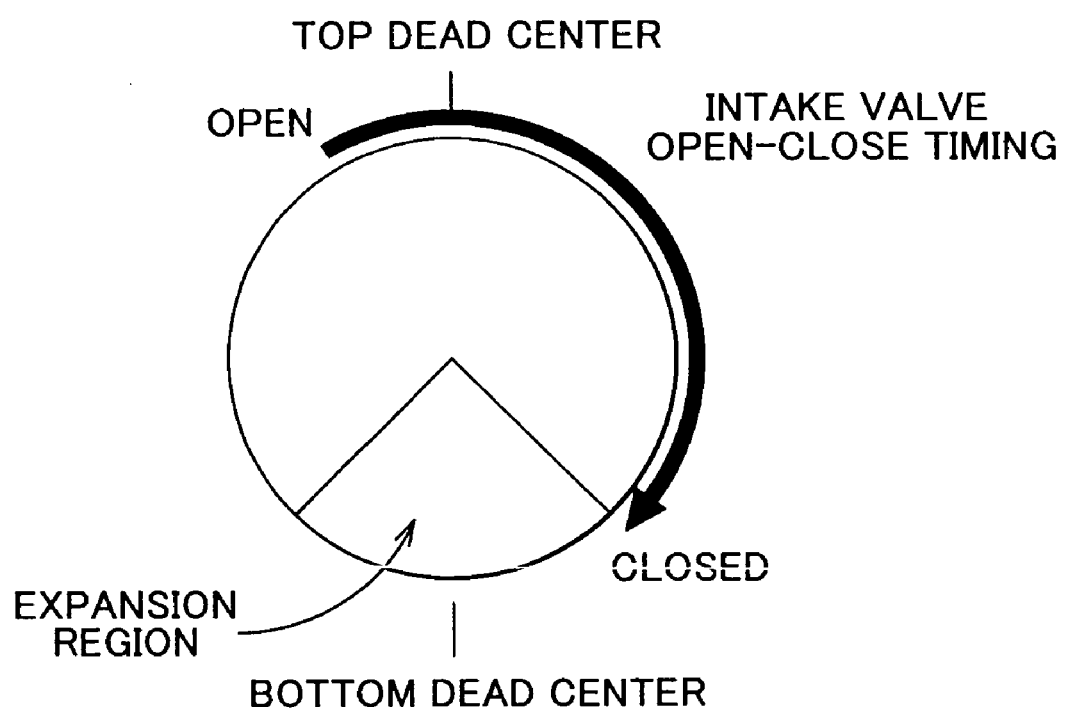
FIG. 2 is a diagram illustrating the open-close timing of an intake valve.

The engine 22 is provided as an internal combustion engine that outputs power from a hydrocarbon fuel such as gasoline, light oil, etc. The engine 22 is pre-adjusted so that an intake valve closing timing becomes advanced, whereby the effective compression ratio is reduced so as to efficiently operate the engine with an increased expansion ratio. FIG. 2 indicates an example of the open-close timing of an intake valve. As indicated in FIG. 2, the intake valve is closed at an intermediate point during the intake stroke, so that the intake gas inside the cylinder is expanded, and then is compressed. The engine 22 is subjected to operation control, such as a fuel injection control, an ignition control, an intake air amount adjusting control, etc., by an engine-purpose electronic control unit (hereinafter, referred to as "engine ECU") 24. The engine ECU 24 receives input of signals needed for the control, such as a signal indicative of the rotation speed Ne of the engine 22 from a rotation speed sensor 62 that actually detects the rotation speed of the crankshaft 26, a reference pulse signal from a crank angle reference sensor 64 that outputs a reference value of rotation angle of the crankshaft 26 in the form of pulses, etc. Furthermore, the engine ECU 24 communicates with the hybrid-purpose electronic control unit 70, and operates and controls the engine 22 on the basis of control signals from the hybrid-purpose electronic control unit 70, and outputs data regarding the state of operation of the engine 22 to the hybrid-purpose electronic control unit 70 in accordance with need.

The power distribution/integration mechanism 30 has a sun gear 31 that is an external tooth gear, a ring gear 32 that is an internal tooth gear disposed concentrically with the sun gear 31, a plurality of pinion gears 33 in mesh with the sun gear 31 and also in mesh with the ring gear 32, and a carrier 34 supporting the pinion gears 33 in such a manner as to allow rotation and revolution thereof. The power distribution/integration mechanism 30 is formed as a planetary gear mechanism that performs differential operation using the sun gear 31, the ring gear 32 and the carrier 34 as rotation elements. In the power distribution/integration mechanism 30, the carrier 34 is connected to the crankshaft 26 of the engine 22, and the sun gear 31 is connected to the electric motor MG1, and the ring gear 32 is connected to the electric motor MG2.

When the electric motor MG1 functions as a generator, the power input from the engine 22 via the carrier 34 is distributed toward the sun gear 31 and toward the ring gear 32 in accordance with the gear ratio thereof. When the motor MG1 functions as an electric motor, the power input from the engine 22 via the carrier 34 and the power input from the motor MG1 via the sun gear 31 are integrated and output to the ring gear 32. The ring gear 32 is mechanically connected to driving wheels 39a, 39b of the vehicle that are front wheels thereof, via a belt 36, a gear mechanism 37 and a differential gear 38. Therefore, the power output to the ring gear 32 is output to the driving wheels 39a, 39b via the belt 36, the gear mechanism 37 and the differential gear 38. The three shafts connected to the power distribution/integration mechanism 30, in a view as a drive apparatus, are the crankshaft 26 that is an output shaft of the engine 22 connected to the carrier 34, and a sun gear shaft 31a that is connected to the sun gear 31 and forms a rotation shaft of the motor MG1, and a ring gear shaft 32a that is a drive shaft connected to the ring gear 32 and mechanically connected to the driving wheels 39a, 39b.

Each of the motor MG1 and the motor MG2 is formed as a well-known synchronous generator-motor that is able to operate as a power generator and also operate as an electric motor. The motors MG1, MG2 exchange electric power with a battery 50 via inverters 41, 42. Electric power lines 54 connecting the inverters 41, 42 and the battery 50 are formed as a positive bus line and a negative bus line shared by the two inverters 41, 42 so that electric power generated by one of the two motors MG1, MG2 can be consumed by the other one of the motors. Therefore, the battery 50 is charged and discharged in accordance with the power generation or power shortage caused by the motors MG1, MG2. If the motor MG1 and the motor MG2 balance in electric power budget, the battery 50 is neither charged nor discharged.

The motors MG1, MG2 are driven and controlled by a motor-purpose electronic control unit (hereinafter, referred to as "motor ECU") 40. The motor ECU 40 receives input of signals needed for driving and controlling the motors MG1, MG2, for example, signals from rotational position detecting sensors 43, 44 for detecting the rotational positions of rotors of the motors MG1, MG2, phase currents applied to the motors MG1, MG2 which are detected by current sensors (not shown), etc. The motor ECU 40 outputs switching control signals to the inverters 41, 42. The motor ECU 40 communicates with the hybrid-purpose electronic control unit 70. The motor ECU 40 drives and controls the motors MG1, MG2 on the basis of control signals from the hybrid-purpose electronic control unit 70, and outputs data regarding the states of operation of the motors MG1, MG2 to the hybrid-purpose electronic control unit 70 in accordance with need.

The battery 50 is managed by a battery-purpose electronic control unit (hereinafter, referred to as "battery ECU") 52. The battery ECU 52 receives input of signals needed for managing the battery 50, for example, an inter-terminal voltage from a voltage sensor (not shown) disposed between terminals of the battery 50, a charge or discharge current from a current sensor (not shown) attached to an electric power line 54 connected to an output terminal of the battery 50, a battery temperature from a temperature sensor (not shown) attached to the battery 50, etc. In accordance with need, the battery ECU 52 outputs data regarding the state of the battery 50 to the hybrid-purpose electronic control unit 70 by means of communication. The battery ECU 52 calculates the remaining charge (SOC) based on the integrated value of charge and discharge currents detected by the current sensor, in order to manage the battery 50.

The hybrid-purpose electronic control unit 70 is formed as a microprocessor having a CPU 72 as a central component. In addition to the CPU 72, the hybrid-purpose electronic control unit 70 has a ROM 74 that stores processing programs, a RAM 76 that temporarily stores data, and input/output ports (not shown), and a communication port (not shown). The hybrid-purpose electronic control unit 70 receives, via input ports, an ignition signal from an ignition switch 80, a shift position SP from a shift position sensor 82 that detects the operated position of a shift lever 81, an accelerator operation amount AP from an accelerator pedal position sensor 84 that detects the amount of depression of an accelerator pedal 83, a brake pedal position BP from a brake pedal position sensor 86 that detects the amount of depression of a brake pedal 85, a vehicle speed V from a vehicle speed sensor 88, etc. The hybrid-purpose electronic control unit 70 is connected to the engine ECU 24, the motor ECU 40 and the battery ECU 52 via communication ports as mentioned above. The hybrid-purpose electronic control unit 70 exchanges various control signals and data with the engine ECU 24, the motor ECU 40 and the battery ECU 52.

Figure 3:
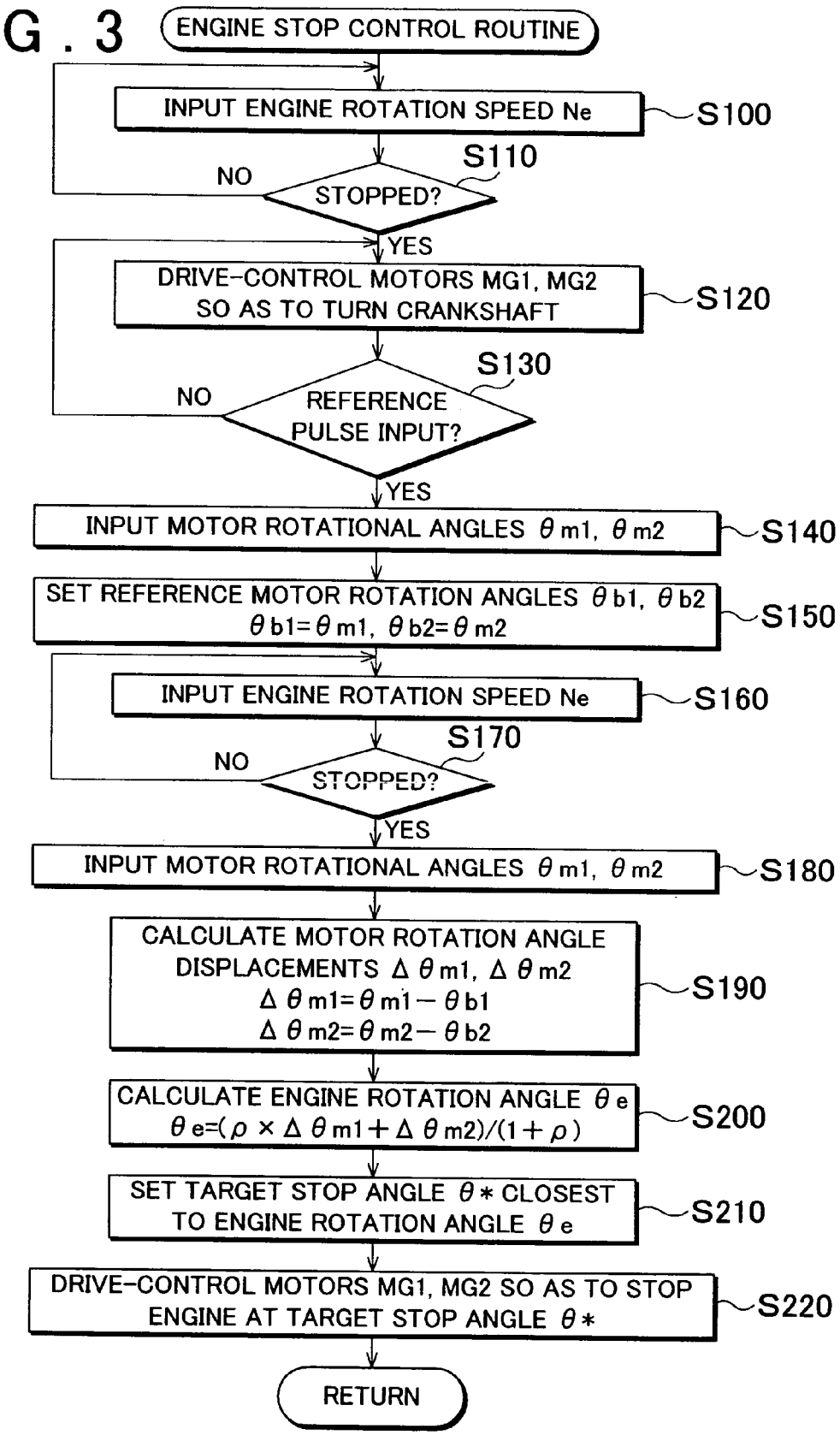
FIG. 3 is a flowchart illustrating an engine stop control routine executed by a hybrid-purpose electronic control unit.

Next, operations of the hybrid motor vehicle 20 of the embodiment constructed as described above and, in particular, an operation performed to stop the engine 22, will be described. FIG. 3 is a flowchart illustrating an engine stop control routine executed by the hybrid-purpose electronic control unit 70. This routine is executed upon a command to stop the operation of the engine 22. Simultaneously with the start of a process based on the engine stop control routine, the engine ECU 24 executes the stopping of the fuel injection of the engine 22.

When the engine stop control routine is executed, the CPU 72 of the hybrid-purpose electronic control unit 70 first inputs the rotation speed Ne of the engine 22 that is detected by the rotation speed sensor 62 and transmitted from the engine ECU 24 (step S100). Subsequently the CPU 72 determines whether the rotation speed Ne is "0", that is, whether the engine 22 has stopped rotating due to the stop of fuel injection caused by the engine ECU 24 (step S110). Although in this embodiment, the rotation speed Ne is detected by the rotation speed sensor 62, and is input to the CPU 72 by transmission from the engine ECU 24, the rotation speed Ne input to the CPU 72 may be acquired through calculation in an engine rotation speed calculation routine (not shown) based on the gear ratio ρ (the number of teeth of the sun gear/the number of teeth of the ring gear) of the power distribution/integration mechanism 30, and the rotation speeds Nm1, Nm2 of the motors MG1, MG2 that are computed on the basis of the rotational positions θm1, θm2 thereof detected by the rotational position detecting sensors 43, 44 and that are input by transmission from the motor ECU 40.

When it is determined in step S110 that the rotation speed Ne of the engine 22 has reached the value "0" and therefore the engine 22 has stopped rotating, the CPU 72 then transmits control signals to the motor ECU 40 so as to drive and control the motors MG1, MG2 to turn the crankshaft 26 until the reference pulse is input from the engine ECU 24 (steps S120 and S130). When the reference pulse is input (YES at step S130), the CPU 72 inputs from the motor ECU 40 the rotational positions θm1, θm2 of the motors MG1, MG2 detected by the rotational position detecting sensors 43, 44 (step S140). After that, the CPU 72 sets the input rotational positions θm1, θm2 as reference rotation angles θb1, θb2 (step S150). The drive-control of the motors MG1, MG2 is performed as follows. The motor MG1 is driven and controlled so as to output a torque that is sufficient to turn the crankshaft 26 of the engine 22 by an amount of one cycle. The motor MG2 is driven and controlled so as to output a torque for bearing the reaction force that occurs as the motor MG1 outputs the aforementioned torque to the crankshaft 26. It is to be noted that the aforementioned input of the reference pulse is accomplished by turning the crankshaft 26 of the engine 22 by at most the amount of rotation of one cycle. After that, the CPU 72 inputs the rotation speed Ne of the engine 22 (step S160), and waits for the stop of rotation of the engine 22 (step S170).

If it is determined that the engine 22 has stopped rotating (YES at step 170), the CPU 72 inputs from the motor ECU 40 the rotational angles θm1, θm2 of the motors MG1, MG2 detected by the rotational position detecting sensors 43, 44 again (step S180). The CPU 72 then subtracts the reference rotation angles θb1, θb2 from the input rotational angles θm1, θm2 to calculate rotation angle displacements Δθm1, Δθm2, respectively (step S190). From the rotation angle displacements Δθm1, Δθm2 and the gear ratio ρ of the power distribution/integration mechanism 30, the CPU 72 calculates a rotation angle θe of the engine 22 as in equation (1) (step S200).

$$\theta e = \frac{\rho \times \Delta\theta m1 \times \Delta\theta m2}{1+\rho} \quad (1)$$

After calculating the rotation angle θe of the engine 22 at the time of stop of the engine 22, the CPU 72 sets a target stop position θ* that is the closest to the rotation angle θe (step S210). The target stop position θ* is set at a position outside a region in which the intake gas in the cylinder is expanded when the intake valve is closed and the internal combustion engine starts a compression stroke (see FIG. 2). In this embodiment, in particular, the target stop position θ* is set at the position of intake valve closure which immediately precedes the initial compression stroke that occurs during the next operation of starting the engine 22, or at a position that is substantially symmetric to the position of intake valve closure with respect to a vertical straight line passing through the bottom dead center. This setting is adopted for the following reason. That is, if the engine 22 is stopped within the region in which the intake gas in the cylinder is expanded when the intake valve is closed and the internal combustion engine starts the compression stroke, negative pressure occurs within the cylinder so that extraneous air will enter the cylinder space. As a result, when the engine 22 is next started, an increased compression ratio is involved in the initial compression stroke, so that knocking or the like may occur.

After setting the target stop position θ*, the CPU 72 transmits a control signal to the motor ECU 40 so as to drive and control the motors MG1, MG2 so that the engine 22 stops at the target stop position θ* (step S220). After that, the present routine ends. The drive-control of the motors MG1, MG2 is performed, for example, in the following fashion. The motor MG1 is driven and controlled so as to output a torque that cancels out a deviation of the rotation angle θe of the engine 22 from the target stop position θ*, taking the friction of the engine 22 and the like into account. The motor MG2 is driven and controlled so as to output a torque for bearing the reaction force that occurs as the motor MG1 outputs the aforementioned torque to the crankshaft 26. If the set target stop position θ* is in a direction from the rotation angle θe occurring at the time of stop of the engine which is opposite to the direction of operation of the engine 22, the electric motor MG1 is driven and controlled so as to output a torque that reverses the engine 22.

According to the hybrid motor vehicle 20 of the embodiment described above, the engine 22 is stopped at the position outside the region in which the intake gas in the cylinder is expanded when the intake valve is closed and the internal combustion engine starts the compression stroke. Therefore, the hybrid motor vehicle 20 is able to prevent an incident where during a stop of the engine 22, air enters a cylinder space, and where when the engine 22 is next started, an increased compression ratio is involved in the initial compression stroke. Hence, the hybrid motor vehicle 20 is able to substantially prevent or reduce the occurrence of knocking or the like. As a result, the engine 22 can be smoothly started. Thus, the startability of the engine 22 will further improve. In this embodiment, the engine 22 is stopped, and the stopped position is detected before the engine 22 is moved to the target stop position θ*. Therefore, the engine 22 can be stopped at the target stop position θ* with increased precision.

In the hybrid motor vehicle 20 of this embodiment, the engine 22 is stopped at the position of intake valve closure which immediately precedes the initial compression stroke, or at a position that is substantially symmetric to the position of intake valve closure with respect to a vertical straight line passing through the bottom dead center. However, the stop position of the engine 22 is not limited to these positions, but may be set at any position as long as the position is outside the region in which the intake gas in the cylinder is expanded when the intake valve is closed and the internal combustion engine starts the compression stroke, that is, outside the region that leads to an increased compression ratio in the initial compression stroke that occurs when the engine is next started.

In the hybrid motor vehicle 20 of the foregoing embodiment, the rotational angles θm1, θm2 of the motors MG1, MG2 detected by the rotational position detecting sensors 43, 44 at the time of input of the reference pulse are set as the reference rotation angles θb1, θb2. Using the reference rotation angles θb1, θb2, the rotation angle displacements Δθm1, Δθm2 are computed. On the basis of the computed rotation angle displacements Δθm1, Δθm2 and the gear ratio ρ of the power distribution/integration mechanism 30, the rotation angle θe of the engine 22 is computed. However, if the rotation angle of the engine 22 is directly detected, the detected rotation angle may be used.

In the hybrid motor vehicle 20 of the foregoing embodiment, upon a command to stop the operation of the engine 22, the engine 22 is stopped, and then is moved to the target stop position θ*. However, the engine 22 may also be stopped directly at the target stop position θ* without a stop although this manner of stopping the engine 22 slightly reduces precision. If this manner of stopping the engine 22 is adopted, it is appropriate to predict the stop position from time-dependent changes in the rotation speed Ne of the engine 22, or the like, and to adjust the torques output by the motors MG1, MG2 so that the predicted stop position becomes the same as the target stop position θ*.

Figure 4:
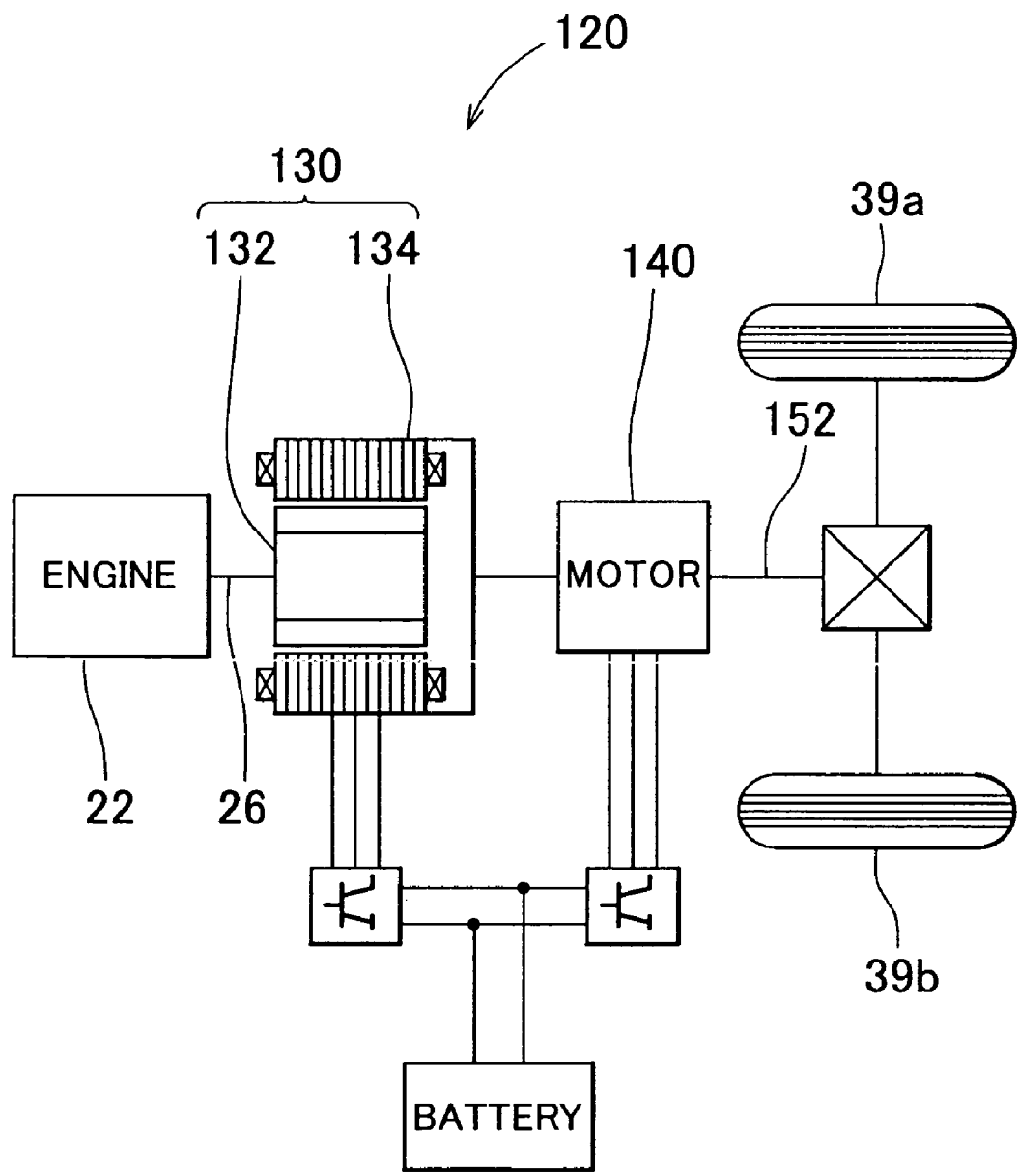
FIG. 4 is a schematic diagram illustrating a construction of a hybrid motor vehicle in accordance with a modification of the embodiment.

In the hybrid motor vehicle 20 of the embodiment, the engine 22 capable of operating with a high expansion ratio by reducing the effective compression ratio through advancement of the intake valve closing timing is stopped at a position outside the region in which the intake gas in the cylinder is expanded when the intake valve is closed and the internal combustion engine starts the compression stroke. As an arrangement for stopping the engine 22 at the aforementioned position, the hybrid motor vehicle 20 is equipped with the power distribution/integration mechanism 30 and the motors MG1, MG2 connected to the power distribution/integration mechanism 30. However, any arrangement may be adopted for this purpose as long as the arrangement achieves substantially the same advantages as mentioned above, that is, as long as the arrangement makes it possible to output torque to the crankshaft 26 of the engine 22. For example, as exemplified by a hybrid motor vehicle 120 in accordance with a modification shown in FIG. 4, it is possible to adopt an arrangement that includes a motor 130 which has an inner rotor 132 connected to the crankshaft 26 of the engine 22, and an outer rotor 134 connected to a drive shaft 152 provided for outputting power to the driving wheels 39a, 39b, and which produces relative rotations of the inner rotor 132 and the outer rotor 134 due to an electromagnetic action between the two rotors, and that further includes a motor 140 capable of outputting power directly to the drive shaft 152. In the hybrid motor vehicle 120 of this modification, the engine 22 can be stopped at a desired position by the motor 130 while the reaction force is borne by the motor 140 connected to the drive shaft 152. Therefore, the hybrid motor vehicle 120 of the modification can achieve substantially the same advantages as those of the hybrid motor vehicle 20 of the foregoing embodiment.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control method of a drive apparatus having an internal combustion engine that operates with a high expansion ratio by reducing an effective compression ratio through advancement of an intake valve closing timing, and a torque output device capable of outputting a torque to an output shaft of the internal combustion engine, comprising the steps of:

detecting a stop of operation of the internal combustion engine;
   applying a torque to the output shaft of the internal combustion engine via the torque output device; and
   controlling driving of the torque output device so that the internal combustion engine stops at a target stop position which is set outside a region that leads to an increased compression ratio in an initial compression stroke when the internal combustion engine is next started;

wherein the driving of the torque output device is controlled so that the internal combustion engine stops at a target stop position set outside a region in which an intake gas in a cylinder is expanded after closure of an intake valve until start of compression of the intake gas;

wherein the driving of the torque output device is controlled so that the internal combustion engine stops at a target stop position that is a predetermined angle apart from a bottom dead center of the initial compression stroke when the internal combustion engine is next started;

wherein the driving of the torque output device is controlled so that the internal combustion engine stops at a target stop position which is set at or near a position of intake valve closure that immediately precedes the initial compression stroke, or which is set at or near a position that is substantially symmetric to the position of intake valve closure with respect to a vertical straight line passing through a bottom dead center; and wherein the driving of the torque output device is controlled so that the internal combustion engine stops, and then moves to the target stop position of the internal combustion engine.

2. The control method according to claim 1, wherein the driving of the torque output device is controlled so that a cylinder that has a shortest reach to the target stop position when the internal combustion engine stops reaches the target stop position.

3. The control method according to claim 1, further comprising the steps of:
detecting a rotational position of the output shaft of the internal combustion engine, and
controlling the driving of the torque output device based on the rotational position of the output shaft of the internal combustion engine detected.

4. The control method according to claim 3, wherein the driving of the torque output device is controlled based on the rotational position of the output shaft of the internal combustion engine when the internal combustion engine stops, and the target stop position.

5. A drive apparatus having an internal combustion engine that operates with a high expansion ratio by reducing an effective compression ratio through advancement of an intake valve closing timing, comprising:
a torque output device capable of outputting a torque to an output shaft of the internal combustion engine; and
a controller that, upon a command to stop operation of the internal combustion engine, controls driving of the torque output device so that the internal combustion engine stops at a target stop position which is set outside a region that leads to an increased compression ratio in an initial compression stroke when the internal combustion engine is next started;

wherein the controller controls the driving of the torque output device so that the internal combustion engine stops at a target stop position set outside a region in which an intake gas in a cylinder is expanded after closure of an intake valve until start of compression of the intake gas;

wherein the controller controls the driving of the torque output device so that the internal combustion engine stops at a target stop position that is a predetermined angle apart from a bottom dead center of the initial compression stroke when the internal combustion engine is next started;

wherein the controller controls the driving of the torque output device so that the internal combustion engine stops at a target stop position which is set at or near a position of intake valve closure that immediately precedes the initial compression stroke, or which is set at or near a position that is substantially symmetric to the position of intake valve closure with respect to a vertical straight line passing through a bottom dead center; and wherein the controller controls the driving of the torque output device so that the internal combustion engine stops, and then moves to the target stop position of the internal combustion engine.

6. The drive apparatus according to claim 5, wherein the controller controls the driving of the torque output device so that a cylinder that has a shortest reach to the target stop position when the internal combustion engine stops reaches the target stop position.

7. The drive apparatus according to claim 5, further comprising a rotational position detection device that detects a rotational position of the output shaft of the internal combustion engine,
wherein the controller controls the driving of the torque output device based on the rotational position of the output shaft of the internal combustion engine detected by the rotational position detection device.

8. The drive apparatus according to claim 7, wherein the controller controls the driving of the torque output device based on the rotational position of the output shaft of the internal combustion engine when the internal combustion engine stops, and the target stop position.

9. The drive apparatus according to claim 5, further comprising a three-shaft type power input/output device in which three shafts that are a rotation shaft, a drive shaft and the output shaft of the internal combustion engine are included, and in which if powers input to or output from any two of the three shafts are determined, a power input to or output from the remaining one of the three shafts is also determined,
wherein the torque output device includes a first electric motor connected to the rotation shaft, and a second electric motor connected to the drive shaft.

10. The drive apparatus according to claim 9, wherein the rotational position detection device detects the rotational position of the output shaft of the internal combustion engine based on the rotational position of the drive shaft and the rotational position of the rotation shaft.

11. A motor vehicle comprising a drive apparatus as described in claim 5.

* * * * *